United States Patent
DeVoe

(10) Patent No.: US 8,556,339 B2
(45) Date of Patent: Oct. 15, 2013

(54) LATCH LOCK OUT

(75) Inventor: Shane A. DeVoe, Ortonville, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 746 days.

(21) Appl. No.: 12/592,748

(22) Filed: Dec. 2, 2009

(65) Prior Publication Data

US 2011/0127812 A1   Jun. 2, 2011

(51) Int. Cl.
*A47C 7/62* (2006.01)

(52) U.S. Cl.
USPC ............ 297/188.14; 297/188.15; 297/188.04; 292/252

(58) Field of Classification Search
USPC ............. 297/188.19, 188.14–188.15, 411.32, 297/463.1, 188.04; 292/80, 231, 252, 210, 292/153, 108
See application file for complete search history.

(56) References Cited

U.S. PATENT DOCUMENTS

| | | | |
|---|---|---|---|
| 4,579,384 A | 4/1986 | Sharod | |
| 4,652,029 A | 3/1987 | Yamamoto | |
| 4,714,286 A | 12/1987 | Yamamoto | |
| 4,865,368 A | 9/1989 | McCall et al. | |
| 4,906,044 A * | 3/1990 | Wilstermann | 297/188.15 |
| 5,116,099 A | 5/1992 | Kwasnik et al. | |
| 5,425,568 A | 6/1995 | Sliney et al. | |
| 5,788,324 A | 8/1998 | Shea et al. | |
| 5,803,537 A * | 9/1998 | Langmeser et al. | 297/188.19 |
| 5,810,434 A * | 9/1998 | Thompson et al. | 297/188.19 |
| 5,873,633 A | 2/1999 | Lang et al. | |
| 6,761,382 B2 | 7/2004 | Ji et al. | |
| 6,843,528 B2 * | 1/2005 | Glynn et al. | 297/188.01 |
| 6,948,776 B1 | 9/2005 | Harmon et al. | |
| 6,966,583 B2 | 11/2005 | Ji et al. | |
| 7,083,205 B2 | 8/2006 | Hall | |
| 7,114,772 B2 * | 10/2006 | Kobayashi et al. | 297/188.04 |
| 2006/0208506 A1 * | 9/2006 | Kern et al. | 292/304 |

* cited by examiner

*Primary Examiner* — David Dunn
*Assistant Examiner* — Erika Garrett
(74) *Attorney, Agent, or Firm* — Raggio & Dinnin, P.C.

(57) ABSTRACT

A latch lock out assembly for use with an armrest of a vehicle is disclosed. The latch lock out assembly comprises a flexible body secured to the armrest on an end of the body. The latch lock out assembly also comprises a generally cylindrically shaped blocking member arranged on an end of the body. The blocking member will be used to block the disengagement of a latch from a locking surface when the armrest is in a generally vertical or seat back position but flex or bend to a secondary or disengaged position when the armrest is in a generally horizontal position within the vehicle.

11 Claims, 3 Drawing Sheets

LATCH LOCK OUT

BACKGROUND OF THE INVENTION

1. Field of the Invention

The present invention relates to an armrest for a vehicle, and more particularly relates to an armrest having a latch lock out assembly arranged therein to prevent an armrest lid latch hook from moving into a disengaged position when the armrest is rotated into a stored or seatback position.

2. Description of Related Art

Storage armrests are well known and widely used in prior art vehicles. Storage armrests have become a popular vehicle accessory with an upper surface of the armrest forming both the resting surface for use as an armrest when in a generally horizontal position between either the front seats of a vehicle or arranged within the rear seats of a vehicle and a cover for a storage compartment or bin defined by the body of the armrest. Generally, any number of latches, such as push button latches, provide access to the armrest cover. As can be appreciated however, when the armrest is in the vertical raised position between the vehicle seats, loose items contained in the storage bin can inadvertently be discharged from the storage bin if the latch is accidentally actuated or damaged, which may occur by reaching between the seats into the rear seats and inadvertently depressing the typical push button latch control mechanism.

In order to overcome this problem of inadvertent opening of the cover of a armrest for use in a vehicle, many in the prior art have proposed using conventional gravity actuated mechanisms. Generally, these gravity actuated mechanisms lock out the latch assembly when the armrest assembly is positioned towards a vertical orientation such as when it is in a stored or seat back position. Some of these prior art lock out designs used such mechanisms as a locking ball, barrel or pendulum to create the lockout desired for the situation. Generally, these prior art mechanisms were characterized by an undesirable noisy rattle that resulted from the moveable portion of the lock-out mechanism being moved by vehicle vibration. Furthermore, some of these prior art mechanisms may not engage completely and thus allow for inadvertent opening of the covers on the armrest. Also, many of these prior art lock out systems may have included design imperfections on surfaces and free parts within the mechanism may hinder the proper operation of the lock out mechanism thus also leading to inadvertent opening of the cover and spilling of the contents within the vehicle. Also it should be noted that many of these prior art mechanisms required many parts and were labor intensive to manufacture and assemble within the armrest for use in the vehicle.

Therefore, there is a need in the art for a low cost, light weight latch lock out assembly for use in an armrest that rotates between a generally vertical seat back position and a generally horizontal or armrest position within a vehicle interior. There also is a need in the art for a lock out assembly that is easy to install and reduces the number of parts necessary to provide the lock out function. There also is a need in the art for a light weight and low noise alternate for a lock out mechanism for use in a vehicle armrest that rotates between a generally vertical position to a generally horizontal position within a vehicle interior. There also is a need in the art for an improved latch lock out assembly that reduces production time, cost and parts while also reducing the potential for noise to occur between the moveable portion of the lockout assembly and the surrounding armrest structure.

SUMMARY OF THE INVENTION

One object of the present invention may be to provide a new latch lock out assembly.

Another object of the present invention may be to provide a new latch lock out assembly for use in an armrest in a vehicle.

Still another object of the present invention may be to provide a latch lock out mechanism that prevents an armrest lid latch hook from moving into a disengaged position when the armrest is rotated into a stored or seat back position.

Yet a further object of the present invention may be to provide a gravity activated latch lock out that uses a flexible design component that can bend into a disengaged or secondary position.

Still a further object of the present invention may be to provide a latch lock out assembly that is quiet during vehicle operation and movement of the armrest.

Yet another object of the present invention may be to provide a latch lock out assembly that includes a body and a blocking member, wherein the blocking member has a plurality of over molded ribs arranged thereon.

Still another object of the present invention may be to provide a latch lock out assembly that includes a blocking member having a substantially rigid inner core while the latch lock out assembly generally is made from a moldable or formable elastomeric material thus having a predetermined spring coefficient and flex or bend point arranged thereon.

Still another object of the present invention may be to provide a latch lock out assembly that has fewer parts and is easier to install and manufacture than prior art latch lock out assemblies.

According to the present invention, the foregoing objects and advantages are obtained by a novel design for a latch lock out assembly for use in an armrest of a vehicle. The latch lock out assembly generally comprises a flexible body secured to the armrest on one end of the body. The latch lock out assembly also includes a generally cylindrically shaped blocking member arranged on an end of the body. The blocking member has a plurality of ribs over molded an outer surface thereof. The latch lock out assembly will move via gravity between an engaged locking position and a disengaged secondary position.

One advantage of the present invention may be that it provides for an improved armrest lid latch lock out assembly.

A further advantage of the present invention may be that it provides for a latch lock out assembly that operates via gravity between a generally horizontal position and a generally vertical position.

Still a further advantage of the present invention may be that it provides a latch lock out assembly that includes a blocking member and a body wherein both are molded or formed from a generally flexible plastic, natural material, etc.

Still another advantage of the present invention may be that it provides a latch lock out assembly that reduces the noise of the latch lock out assembly during vehicle operation.

Still another advantage of the present invention may be that it provides a latch lock out assembly that is lighter in weight, easier to manufacture and easier to install within the armrest of a vehicle.

Other objects, features and advantages of the present invention will become apparent from the subsequent description and appended claims, taken in conjunction with the accompanying drawings.

BRIEF DESCRIPTION OF THE PREFERRED EMBODIMENT(S)

Figure 1:
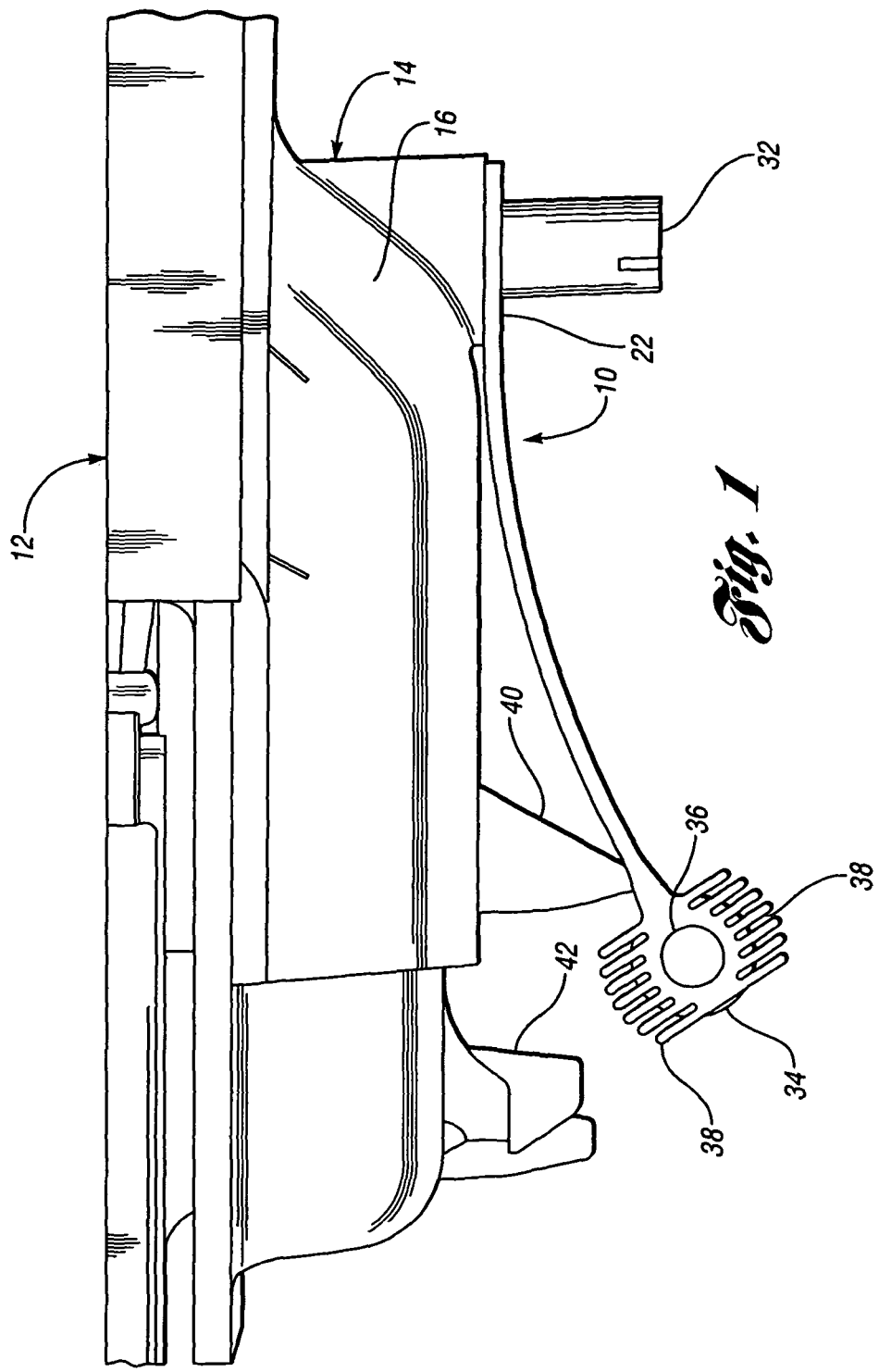
FIG. 1 shows a side view of a latch lock out assembly arranged in an armrest according to the present invention.

Referring to the drawings, there is shown a latch lock out assembly 10 according to an embodiment of the present invention. Generally, the present invention provides a latch lock out assembly 10 for use in an armrest 12 of a vehicle. The armrest 12 may generally be used between the front two seats of a vehicle or in any of the rear seats of a vehicle. The armrest 12 may be capable of folding into a generally vertical or stored or seat back position and then rotated down into a generally horizontal position with relation to the seating surface of the automotive vehicle. This provides an armrest for the user of the seats arranged adjacent to the armrest 12 when the armrest is in its down or generally horizontal or in use position. The armrest 12 may be arranged between two split sections of a front bench seat or bucket seats of an automotive vehicle or be an armrest arranged generally near a middle portion or any other portion of any rear seats of a vehicle including bench seats wherein the armrest 12 is folded into the seat back in its generally vertical position thus allowing for a user to sit in position on the seat with the armrest 12 of the present invention folded into the seat back. However, if the seat back is to be used as an armrest 12 between two opposing seating positions in a rear vehicle seat, the armrest 12 may be folded down into an in use or generally horizontal position between occupants of the rear seat of any known vehicle. Therefore, the armrest 12 may be arranged over a center console and arranged between two seats or arranged within a seat back itself and capable of rotating between a generally vertical position and a generally horizontal position. Generally, the latch lock out assembly 10 will act as a blocking or lock out mechanism that will prevent an armrest lid latch hook from moving into a disengaged position when the armrest 12 is rotated into a stored or seat back position. The intent is to prevent a vehicle rear seat occupant or a front seat occupant from being able to accidentally open the armrest bin lid when the armrest 12 is in a seat back position thereby preventing the bin contents from spilling into the interior of the vehicle. It should be noted that the latch lock out assembly 10 of the present invention may be used in any type of vehicle including but not limited to automotive vehicles, aeronautical vehicles, marine vehicles, or the like wherein an armrest 12 rotates between a generally vertical position and generally horizontal position within the vehicle.

Figure 2:
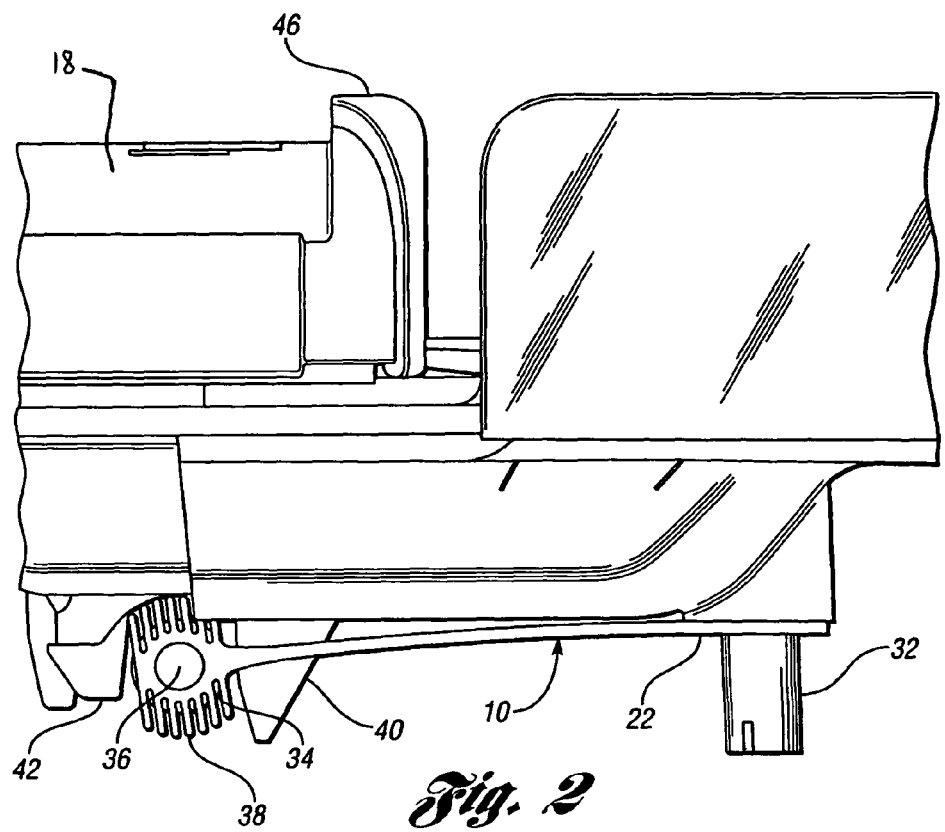
FIG. 2 shows a latch lock out assembly in a generally vertical or seat back position according to the present invention.
Figure 3:
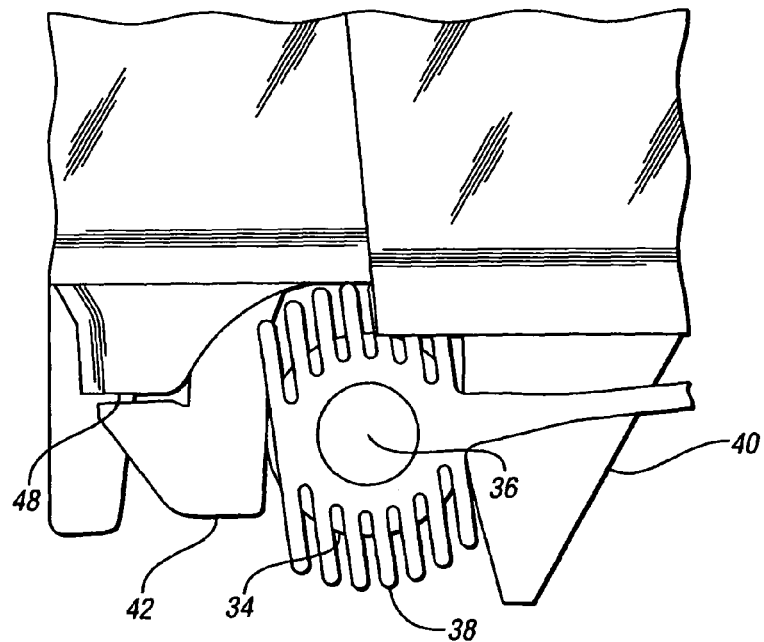
FIG. 3 shows a latch lock out assembly in its generally vertical or seat back position according to the present invention.
Figure 4:
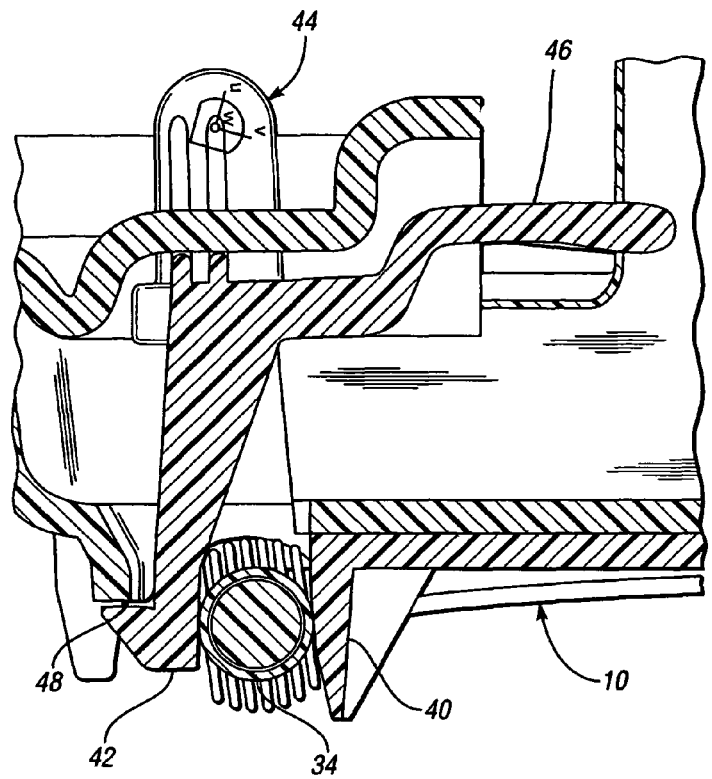
FIG. 4 shows a section of the latch lock out assembly in its engaged position within the armrest of the vehicle.
Figure 5:
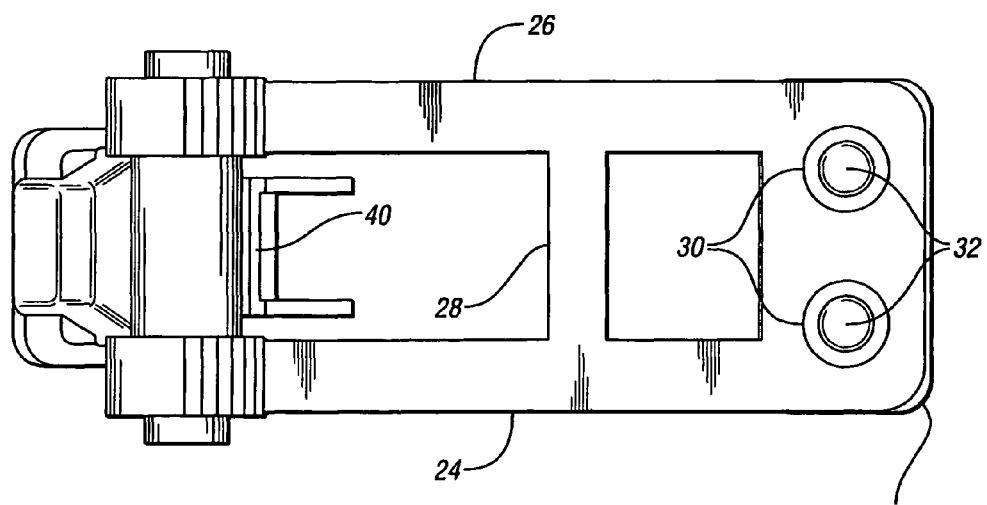
FIG. 5 shows a top view of the latch lock out assembly arranged within the armrest according to the present invention.

As shown in FIGS. 1 through 5, the armrest 12, which uses the latch lock out assembly 10 according to the present invention, generally will include a body 14 having a bin 16 arranged therein. The bin 16 may be of any shape and capable of having any known compartments therein for holding any type of items or components within the vehicle interior for use by the occupants of the vehicle. Generally, the body 14 of the armrest 12 may have a hinge preferably located at the rearward end of the body 14 so that a cover 18 will open from the front and pivot towards the seat back. However, it should be appreciated that the present invention can be utilized with other hinge orientations. The hinge may be pivotally mounted to a seat such as an automotive passenger seat and more specifically between the front seats of an automotive vehicle or the rear seats of an automotive vehicle. Thus the armrest 12 can be pivoted between a generally vertical or upright seat back position and a generally horizontal or in use position such that the armrest 12 can be used by the occupants in adjacent seats to the armrest 12 within the vehicle interior. The horizontal position may also allow access to the bin 16 for storage of items and the like. The bin 16 may be configured in any number of contemplated design orientations to provide a variety of storage functions, such as areas for separating and supporting compact disc cases, devices for receiving and holding coins, cell phones, PDA's, computers, lap tops, and countless other devices that are now found and used in motor vehicle interiors. Furthermore, there are also multiple latch mechanisms which may be utilized, to latch the cover or lid 18 of the armrest 12 to the body 14 of the armrest 12 to close the opening of the bin 16 with relation to the interior of the automotive vehicle. The latch lockout 10 will prevent the unintentional opening of the cover 18 thus keeping the contents of the bin from spilling within the interior of the vehicle. The outer surface of the cover 18 may have any type of predetermined padding or support mechanism arranged thereon and then covered by an interior cover material 20 of the vehicle, such as but not limited to vinyl, leather, or any other covering material used on the interior surface of vehicles. The bottom portion of the body 14 may also include a cover material 20 similar to that used in the vehicle seats to aesthetically incorporate the armrest 12 into a seat back position to provide for comfort of a person who may be sitting in the seat where the armrest 12 is folded into the seat back. Thus, the bottom portion of the body 14 of the armrest 12 may also include the necessary padding and cover materials to blend with the aesthetic interior of the vehicle seats and consoles as arranged therein. It should be noted that any type of bin, armrest body, armrest cover or lid and appropriate latch mechanism may be used according to the present invention and that those described above and shown in the figures are just one contemplated embodiment for the armrest 12 according to the present invention.

The latch lock out assembly 10 generally includes a body 22 generally having an overall rectangular shape when viewed from a top thereof. The body 22 generally is flat and will have a predetermined thickness. The body 22 may include a first and second leg 24, 26 extending therefrom and at least one reinforcing member or rib 28 arranged between the first and second leg 24, 26 thereof. The body 22 may have a predetermined length and width that will accommodate the size of the armrest 12 according to the present invention. The body 22 on one end thereof may have a first and second orifice 30 arranged therethrough. These orifices 30 may be used to mount the body 22 of the latch lock out assembly 10 to an inner surface of the body 14 of the armrest 12. Generally, the orifices 30 may have a shape that mimic those of the extensions or posts 32 on which they may be mounted on the armrest body 14. In the embodiment shown the orifices 30 are generally of a circular shape and will be arranged over a first and second post 32 extending a predetermined distance from an inside surface of the body 14 of the armrest 12. The body 22 generally may be made of any known extrudible or moldable elastomeric material, such as but not limited to santoprene, neoprene, epdm or any other known polymer or any other known natural or rubber, plastic type material that is capable of having a predetermined spring coefficient therein thus allowing for a predetermined bend or flex point to occur along the body 22. This allows for the end of the body 22 opposite to the end where the body 22 is connected to the body 14 of the armrest 12 to flex into an out of position due to gravity between a generally vertical or generally horizontal position. The reinforcing rib 28 of the body 22 generally may have a rectangular shape and be the same thickness as that of the body 22 of the latch lock out assembly 10. It should be noted that any other type of material that is capable of flexing or bending may also be used for the latch lock out assembly body 22 including but not limited to metals, ceramics, composites, natural materials, plastics, or any other bendable material. It should be noted that it is also contemplated to include more than one reinforcing rib 28 and that any number of reinforcing ribs 28 or a complete solid body 22 may also be used depending on the environment in which the latch lock out assembly 10 is used.

In one contemplated embodiment the latch lock out assembly 10 is attached to the inside of the body 14 via heat staking. However, the latch lock out assembly 10 may be attached to the main body 14 of the armrest 12 by other methods including but not limited to tinnerman fasteners, glue, snap locks, conventional screws, or any other known mechanical or chemical fastening technology. The connecting of the body 22 of the latch lock out assembly 10 on one end thereof, as shown in the figures, allows for the latch lock out assembly body 22 to bend or flex at a predetermined position due to the spring coefficient of the material used in the latch lock out assembly 10, thus allowing for the opposite unattached end of the latch lock out assembly 10 to move between an engaged and disengaged position with respect to the arm rest body 14.

The latch lock out assembly 10 also includes a blocking member 34 arranged on the end of the latch lock out body 22. The blocking member 34 generally has a cylindrical shape. It should be noted that the blocking member 34 may also have a generally square, oval, hexagonal, etc., or any other known shape. The blocking member 34 generally also may comprise an inner core 36 made of a predetermined material. The inner core 36 generally is made of a hard plastic type material, however any other metal, plastic, ceramic, composite, natural material or the like may be used for the inner core 36 of the blocking member 34 according to the present invention. Generally, the outer portion of the blocking member 34 is made from the same material as that of the body 22 of the latch lock out assembly 10. The block out member 34 generally may also include at least one rib 38 for sound deadening the latch lock out assembly 10. In one contemplated embodiment as shown in the figures, multiple ribs 38 are arranged on a predetermined outer surface portion of the blocking member 34. Generally, the ribs 38 will be arranged and extend from an area of the outer surface of the blocking member 34 that corresponds to the two legs 24, 26 that intersect with the blocking member 34 according to the present invention. Generally, the ribs 38 are overmolded and will provide for sound deadening and damping within the armrest 12 during operation thereof. However, it is also contemplated to have the ribs 38 extend the entire length of the blocking member 34 and not just from the predetermined length or area as shown in the drawings, i.e., the width of the first and second leg 24, 26 of the body 22 of the latch lock out assembly 10. Generally, at least one of the ribs 38 extend in a radial direction from a center point of the inner core 36 or the blocking member 34 with the other ribs 38 extending in an outward direction and a predetermined distance apart from and parallel to the rib 38 extending in a generally radial direction from a center point of the inner core 36 or blocking member 34. The ribs 38 may be configured in any other way, such as but not limited to all of the ribs 38 extending in a radial direction from the inner core 36 center point or the ribs 38 may be an add on feature and formed therein in any known manner. As shown in the figures the inner core 36 may extend a predetermined distance from an outer side surface of the blocking member 34. It should be noted that it is also contemplated to design the blocking member 34 without the ribs 38 extending from an outer surface thereof or even without the inner core 36. The latch lock out assembly 10 may be for use with an armrest 12 having a bin 16 as described above.

The armrest 12 has, in one contemplated embodiment, as shown in the drawings, a first and second post 32 extending from a surface of the body 14 of the armrest 12. The first and second posts 32 will be arranged a predetermined distance apart such that they align with and mate with the first and second orifice 30 of the body 22 of the latch lock out assembly 10 as described above. It should be noted that it is also contemplated to use fastening and attaching methodologies and techniques that do not require the orifices 30 through the body 22 of the latch lock out assembly 10 or may require more than the two orifices shown or less than the two orifices shown and the orifices to be in any other known shape or design depending on the connecting methodology and how the body 22 of the latch lock out assembly 10 is to be connected to the interior surface of the body 14 of the armrest 12. The armrest body 14 may also include a back stop member or stationary wall 40 arranged on and extending from an inner surface thereof. The back stop member 40 generally is adjacent to and a predetermined distance from a hook 42 of the latch mechanism 44 for use in the armrest 12. Generally, the latch mechanism 44 includes a handle 46 pivotally connected to a hook 42 wherein the hook 42 engages a locking shoulder or locking surface 48 arranged on the armrest body 14 or bin that will allow for the hook 42 to engage the locking surface 48 and thus secure the cover 18 in its closed position over the bin 16 opening. When the handle 46 of the latch mechanism 44 is either rotated, pushed, pulled or moved via any known motion, the hook 42 will disengage the hook from the locking surface or locking shoulder 48 of the body 14 of the armrest 12, thus disengaging the cover 18 from the armrest body 14 and allowing for the cover 18, via the hinge, to rotate or slide open allowing for the contents of the armrest bin 16 to be available to the occupants of the vehicle. As shown in the figures there is a predetermined distance between the hook 42 of the latch mechanism 44 and the back stop member 40 of the armrest 12. This predetermined distance can be anywhere from many inches to a tenth of an inch or smaller. Generally, the width or circumference of the blocking member 34 is less than or equal to the distance between the back stop member 40 and the hook 42 when the hook 42 is in its engaged position. This allows for the blocking member 34 to be arranged between the back stop member 40 and the hook 42 of the latch 44 of the armrest 12 when the armrest 12 is in its generally vertical or seatback position. The latch lock out assembly blocking member 34 is arranged therebetween via gravity. Therefore, the latch lock out assembly 10 will block the latch movement by blocking the hook 42. Generally, when the armrest 12 is deployed into a generally vertical or seatback position, the body 22 the lockout assembly 10 allows the blocking member 34 to bend or flex into a position between the latch hook 42 and the stationary wall or backstop member 40 that is a fixed part of the armrest body 14. In this position if the lid latch handle 46 is depressed, pulled upon or the like, the latch hook 42 may move a small amount until it contacts the latch lock out blocking member 34, then if a further depression of the latch handle 46 occurs both the latch hook 42 and the latch blocking mechanism 34 may move a small distance until they contact the stationary or backstop member 40 of the armrest body 14. At this point no more travel of the latch hook 42 will be possible and the hook 42 will stay engaged with the shoulder surface 48 of the armrest body 14 and hence, the lid 18 will not be able to be opened and thus spilling the contents of the bin into the interior of the vehicle. However, if an occupant of the vehicle chooses to rotate the armrest down to its generally horizontal or in use position, gravity will cause the blocking member 34 of the latch lock out assembly 10 to bend or flex via the flexible body portion of the latch lock out assembly 10 into a secondary or disengaged position. In this disengaged position the latch hook 42 movement will no longer be blocked by the latch lockout blocking member 34 and can thereby travel unimpeded when the latch handle 46 is depressed or open or rotated into its open position. This will allow the armrest bin lid 18 to be opened and closed without any obstruction of the latch lock out assembly, thus allowing occupants of the vehicle to remove or store further items within the bin 16 of the armrest 12 having the latch lock out assembly 10 therein.

It should be noted that the latch lock out assembly 10 according to the present invention can have any known shape or dimensions, such that it can fit into any size armrest in any size vehicle known. It should also be noted that any known material, such as but not limited to metals, ceramics, plastics, composites, natural materials or the like may be used to make and manufacture all of the latch lock out assembly 10 components as described herein. The latch lock out assembly 10 according to the present invention will provide a light weight low cost easy to install and manufacture latch lock out assembly 10 that will provide quiet operation which is of utmost importance to consumers of vehicles of today. The latch lock out assembly 10 of the present invention also uses fewer moving parts and will provide a more secure and easily repeatable locking mechanism that will have less failures, thus providing less instances of the items of a bin being inadvertently spilled into the interior of the vehicle via disengagement of the latch mechanism from the body of the armrest 12.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. An armrest for use in a vehicle, said armrest capable of movement between a generally horizontal position and a generally vertical position, said armrest comprising:
    a body having a bin;
    a lid pivotally connected to said body and arranged over said bin;
    a latch secured to said lid and releasably connected to said body;
    a backstop member extending from said body; and
    a flexible latch lockout assembly secured to said body on one end of said lockout assembly, said blocking member having a plurality of ribs extending from an outer surface thereof, said lockout assembly having a blocking member with an inner core.

2. The armrest of claim 1 wherein
    said backstop member and said latch having a gap of a predetermined distance therebetween; and
    an opposite end of said lockout assembly is free to move into or out of said gap.

3. The armrest of claim 1 further comprising
    a post extending from said body, said post having said lockout assembly arranged thereover.

4. The armrest of claim 1 wherein said lockout assembly is heat staked to said body.

5. The armrest of claim 1 wherein said ribs are over molded thereon and provide for sound deadening within the armrest.

6. The armrest of claim 1 wherein said lockout assembly having a lockout body with a generally rectangular shape when viewed from a top.

7. The armrest of claim 6 wherein said lockout body having at least one orifice therethrough.

8. The armrest of claim 6 wherein said lockout body having a reinforcing member arranged between a first and second side of said body.

9. The armrest of claim 6 wherein said lockout body is generally flat with a predetermined spring coefficient.

10. The armrest of claim 1 wherein said blocking member is arranged between said back stop member and said latch when the armrest is in the generally vertical position and presents said latch from disengaging from said body.

11. The armrest of claim 1 wherein said blocking member bends or flexes via gravity to a neutral position when the armrest is in the generally horizontal position thus allowing said lid to be opened.

* * * * *